United States Patent
Deming et al.

(10) Patent No.: US 11,135,740 B2
(45) Date of Patent: Oct. 5, 2021

(54) EXTRUSION DIES AND METHODS AND APPARATUSES FOR FORMING THE SAME

(71) Applicant: Corning Incorporated, Corning, NY (US)

(72) Inventors: Scott Winfield Deming, Elmira, NY (US); John Christopher Thomas, Elmira, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 630 days.

(21) Appl. No.: 15/555,780

(22) PCT Filed: Mar. 4, 2016

(86) PCT No.: PCT/US2016/020796
§ 371 (c)(1),
(2) Date: Sep. 5, 2017

(87) PCT Pub. No.: WO2016/144714
PCT Pub. Date: Sep. 15, 2016

(65) Prior Publication Data
US 2019/0047174 A1    Feb. 14, 2019

Related U.S. Application Data

(60) Provisional application No. 62/129,222, filed on Mar. 6, 2015.

(51) Int. Cl.
*B28B 3/26*    (2006.01)
*B23P 15/24*    (2006.01)
(Continued)

(52) U.S. Cl.
CPC ............ *B28B 3/269* (2013.01); *B23P 15/243* (2013.01); *B29C 48/11* (2019.02); *B28B 1/001* (2013.01);
(Continued)

(58) Field of Classification Search
CPC ............................... B28B 3/269; B23P 15/243
See application file for complete search history.

(56) References Cited

U.S. PATENT DOCUMENTS 2,908,037 A * 10/1959 Harkenrider ............ B29C 48/30
425/192 R
3,038,202 A * 6/1962 Harkenrider ............ B29C 48/11
425/464
(Continued)

FOREIGN PATENT DOCUMENTS

EP    1968366 A1    9/2008
JP    06184206 A    4/1986
(Continued)

OTHER PUBLICATIONS

Translation of JP-2002028910-A.*
(Continued)

*Primary Examiner* — Nahida Sultana
*Assistant Examiner* — Asha A Thomas
(74) *Attorney, Agent, or Firm* — Kurt R. Denniston

(57) ABSTRACT

A honeycomb extrusion die (100), a method of making the same, and an apparatus for forming the same. The die (100) includes: a feed hole plate (202) comprising an input surface (202A), an opposing output surface (202B), and feed holes (108) configured to guide a batch material from the input surface (202A) to the output surface (202B); and a pin assembly (204) comprising pins (300) disposed on the feed hole plate (202). At least one of the pins includes: a tail (304); a head (302) connected to the tail (304) and com-
(Continued)

prising alignment surfaces (314) configured to align the pins (300), flow surfaces (316) disposed between the alignment surfaces (314), and a tapered portion (310) comprising a contact surface (308) adhered to the output surface (202B) of the feed hole plate (202); and a first groove (306) disposed between the head (302) and the tail (304). In the pin assembly (204), the alignment surfaces (314) contact adjacent pins (300) to align the pins (300), such that discharge slots are at least partially defined by the tails (304) of the pins (300).

17 Claims, 10 Drawing Sheets

(51) Int. Cl.
| | | |
|---|---|---|
| *B29C 48/11* | (2019.01) | |
| *B29C 48/345* | (2019.01) | |
| *B28B 1/00* | (2006.01) | |
| *B29L 31/60* | (2006.01) | |
| *B29L 31/00* | (2006.01) | |
| *B30B 11/22* | (2006.01) | |

(52) U.S. Cl.
CPC ....... *B29C 48/345* (2019.02); *B29L 2031/608* (2013.01); *B29L 2031/731* (2013.01); *B30B 11/221* (2013.01)

(56) References Cited

U.S. PATENT DOCUMENTS

| | | |
|---|---|---|
| 3,826,603 A | 7/1974 | Wiley |
| 4,027,868 A | 6/1977 | Jolly |
| 4,041,597 A | 8/1977 | Folmar et al. |
| 4,780,075 A | 10/1988 | Ozaki et al. |
| 4,984,487 A | 1/1991 | Beckmeyer |
| 5,238,386 A | 8/1993 | Cunningham et al. |
| 5,308,568 A | 5/1994 | Lipp |
| 5,761,787 A | 6/1998 | Kragle et al. |
| 5,964,020 A | 10/1999 | Kragle et al. |
| 6,570,119 B2 | 5/2003 | Marcher |
| 6,989,119 B2 | 1/2006 | Bernas et al. |
| 7,162,787 B2 | 1/2007 | Frost |
| 7,603,757 B2 | 10/2009 | Choi |
| 7,678,439 B2 | 3/2010 | Ichikawa |
| 8,435,025 B2 | 5/2013 | Corbett et al. |
| 8,449,283 B2 | 5/2013 | Currie et al. |

FOREIGN PATENT DOCUMENTS

| | | | | |
|---|---|---|---|---|
| JP | 62236710 A | 10/1987 | | |
| JP | 5131424 A | 5/1993 | | |
| JP | 200228910 A | 1/2002 | | |
| JP | 2002028910 A | * | 1/2002 | ............ B28B 3/269 |

OTHER PUBLICATIONS

International Search Report and Written Opinion of the Internaitonal Searching Authority; PCT/US2016/020796; dated September 28, 2016; 21 Pages; European Patent Office.

International Searching Authority Invitation to Pay Additional Fees and Partial Search Report; PCT/US2016/020796; dated June 28, 2016; 6 Pages; European Patent Office.

* cited by examiner

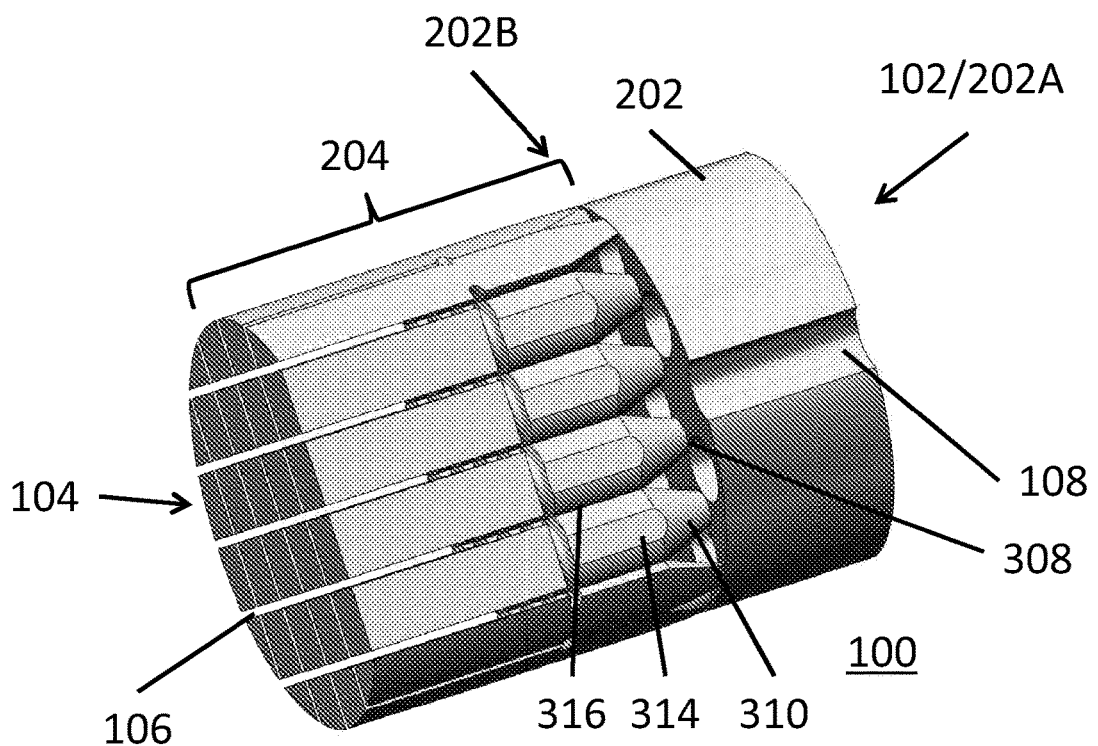
FIG. 2A
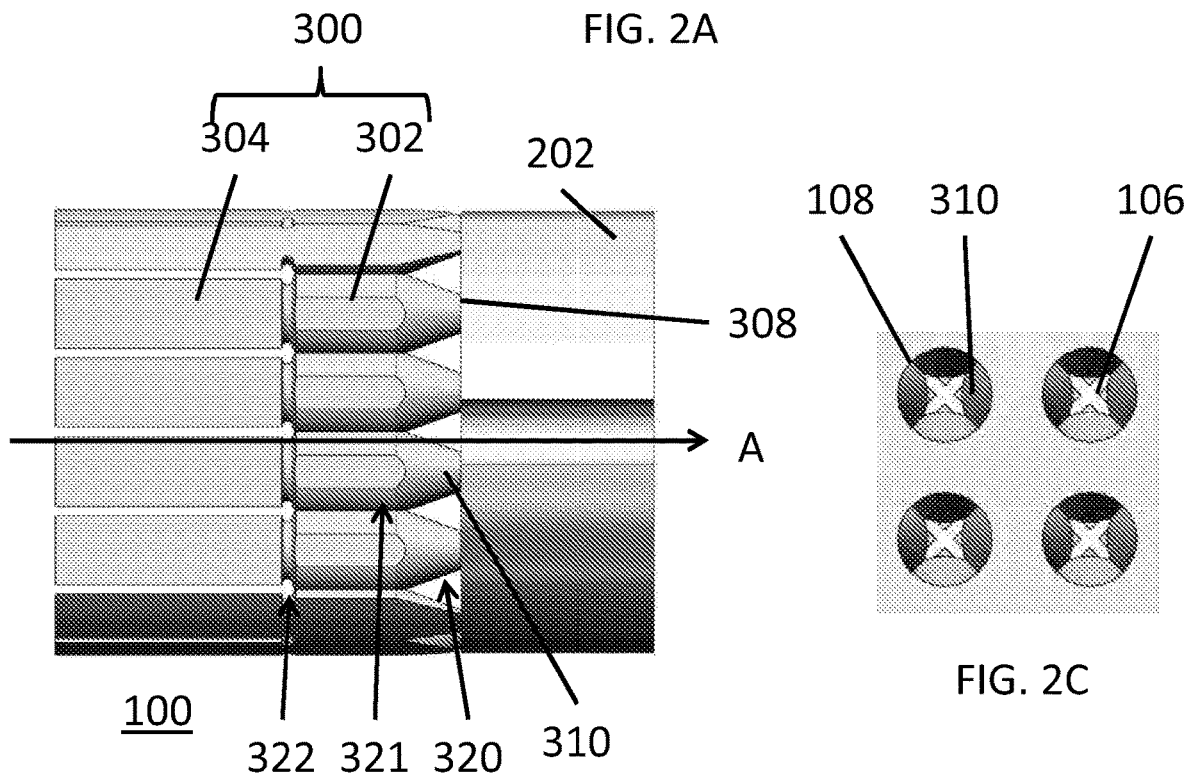
FIG. 2B
FIG. 2C

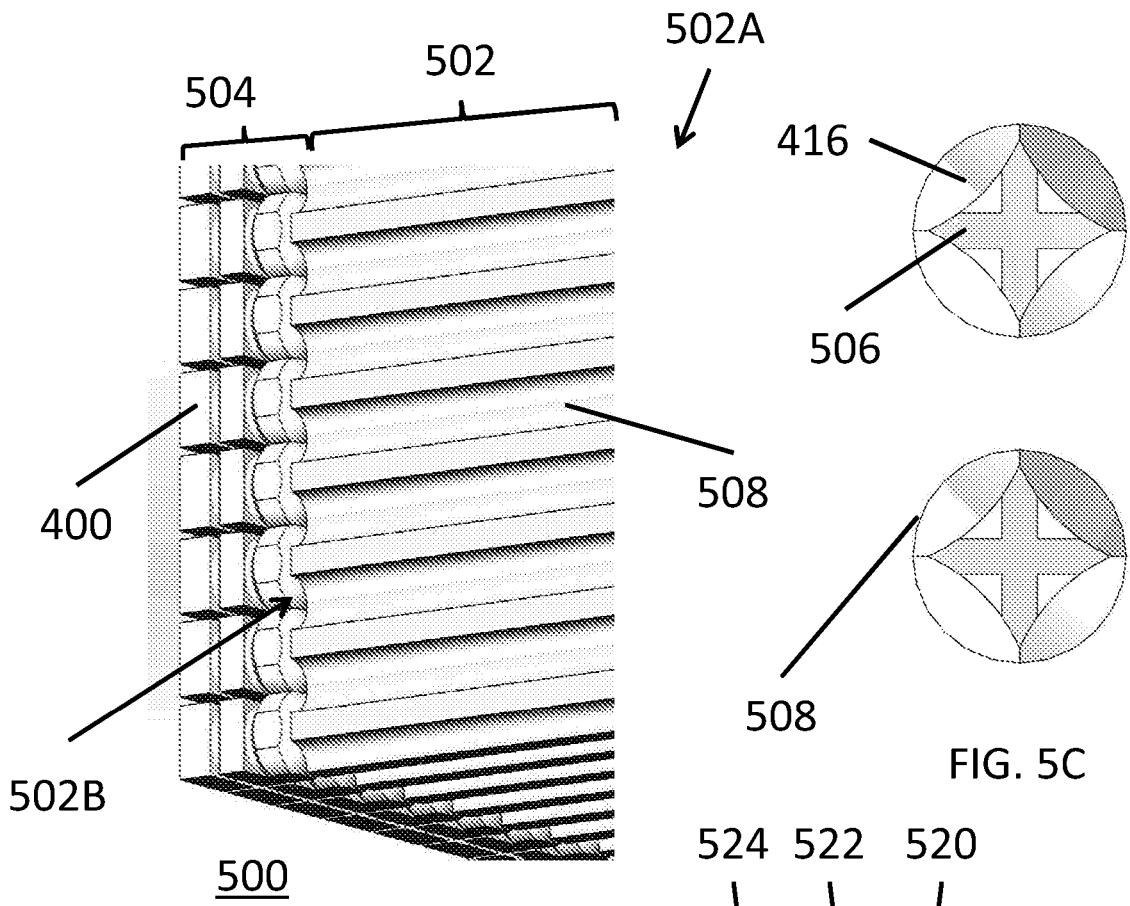
FIG. 5A
FIG. 5C
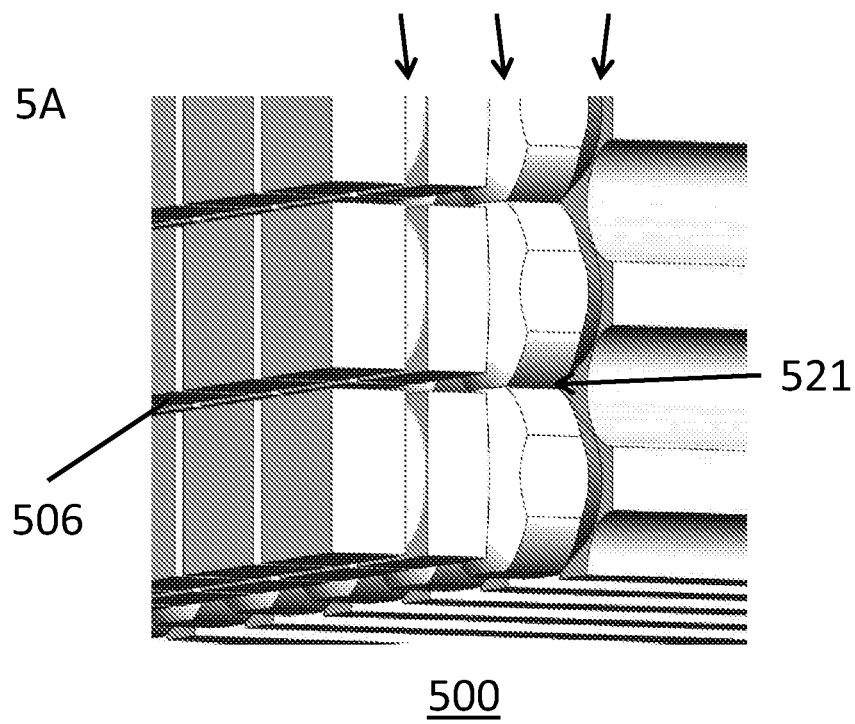
FIG. 5B

FIG. 9A      Form Cutter

EXTRUSION DIES AND METHODS AND APPARATUSES FOR FORMING THE SAME

CROSS REFERENCE TO RELATED APPLICATION

This application is a national stage application under 35 U.S.C. § 371 of International Application No. PCT/US2016/020796, filed on Mar. 4, 2016, which claims the benefit of and priority to U.S. Provisional Patent Application No. 62/129,222, filed on Mar. 6, 2015, the contents of these applications are relied upon and incorporated herein by reference in their entireties.

FIELD

Aspects of the present disclosure relate to extrusion dies and methods and apparatuses for forming the same. Various aspects of the present disclosure relate to extrusion dies including individually manufactured pins that are configured to be precisely bonded together.

DISCUSSION OF THE BACKGROUND

Exhaust gas from internal combustion engines is commonly treated using catalysts on ceramic substrates that have a high degree of internal surface area. Diesel engines, and some direct injection gasoline engines have exhaust streams that are treated using a catalyzed or uncatalyzed ceramic filter for removal of carbon soot particles. These applications typically use porous ceramic flow-through honeycomb-type substrates, partial wall-flow honeycomb filters, or wall-flow honeycomb filters. These honeycomb bodies are typically manufactured via extrusion through an extrusion die.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

SUMMARY

Exemplary embodiments of the present disclosure provide extrusion dies, for example honeycomb extrusion dies, and methods and apparatuses for making the same. Additional features of the invention will be set forth in the description which follows, and in part will be apparent from the description, or may be learned by practice of the invention.

According to various embodiments, provided is an extrusion die comprising: a feed hole plate comprising feed holes that extend through the feed hole plate, from an input surface of the feed hole plate to an opposing output surface of the feed hole plate; and a pin assembly comprising pins disposed on an output surface of the feed hole plate. One or more of the pins comprise: a head comprising alignment surfaces configured to align the pins, flow surfaces disposed between the alignment surfaces, and a tapered portion comprising a contact surface adhered to the output surface of the feed hole plate; a tail connected to the head and extending away from the feed hole plate; and optionally a first groove disposed between the head and the tail. The alignment surfaces of the pins contact adjacent pins, such that the tails of adjacent pins are spaced apart to at least partially define discharge slots, and the flow surfaces of adjacent pins are spaced apart to at least partially define channels.

According to various embodiments, provided is a method of forming an extrusion die, the method comprising: aligning pins on an output surface of a feed hole plate comprising feed holes that extend through the feed hole plate, from an input surface of the plate to the output surface; and adhering the contact portions to the output surface of the feed hole plate. One or more of the pins comprise: a head comprising alignment surfaces configured to align the pins, flow surfaces disposed between the alignment surfaces, and a tapered portion comprising a contact surface adhered to the output surface of the feed hole plate; a tail connected to the head and extending away from the feed hole plate; and a first groove disposed between the head and the tail.

According to various embodiments, provided is an assembly jig for an extrusion die comprising a feed hole plate and pins, the assembly jig comprising: first guides; second guides respectively opposing the first guides, the second guides configured to bias pins of the extrusion die towards the corresponding opposing first guides; a compliant layer disposed between the first guides and the second guides; and a weight configured to bias the compliant layer towards the pins.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention. In the drawings, the size and relative sizes of layers and regions may be exaggerated for clarity. Like reference numerals in the drawings denote like elements.

FIG. 2A is a partial perspective view of a portion of the die of FIG. 1.

FIG. 2B is a side view of the die portion of FIG. 2A.

FIG. 2C is a plan view of the die portion of FIG. 2A.

FIG. 5A is a perspective view of an extrusion die according to various embodiments of the present disclosure.

FIG. 5B is an enlarged view of a portion of FIG. 5A.

FIG. 5C is a top plan view of a portion of the die of FIG. 5A.

FIGS. 9A and 9B respectively illustrate top and side views of a method of manufacturing pins, according to various embodiments of the present disclosure.

DETAILED DESCRIPTION

Figure 1A:
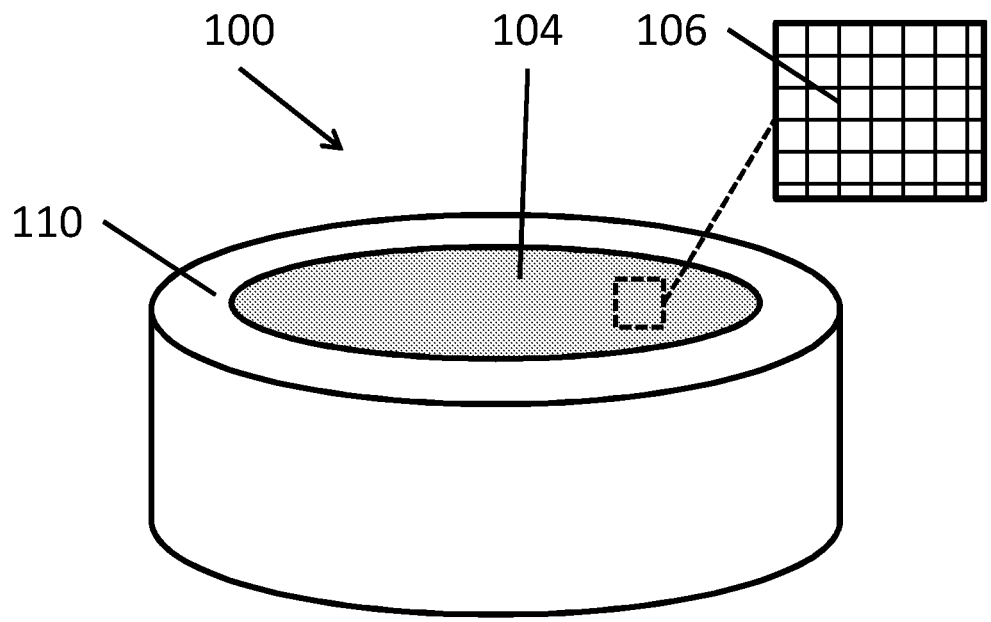
FIG. 1A is a perspective view of an extrusion die according to various embodiments of the present disclosure.

As part of the extrusion process, any non-uniformity in the flow of a batch material through gaps in the die causes defects in the cell structure. For example, a "bow" may occur in the extruded product if the material flows more freely on one side of the die than the other. Slot width non-uniformity may also cause more localized deformities, such as wall and channel defects. The distribution of flow through a die is strongly dependent upon the gap size and internal surface finish of individual slots, such that variations in either are undesirable.

In manufacturing an extrusion die, the slots are traditionally cut from a block of metal using wire electro-discharge machining (WEDM), plunge EDM, or abrasive wheel slitting (AWS). However, these machining methods can be time consuming and expensive to maintain the exacting tolerances needed for an extrusion die.

The present disclosure relates to extrusion dies and methods and apparatuses for making the same.

The extrusion dies may, by way of non-limiting example, be honeycomb extrusion dies. According to various embodiments, the extrusion dies may comprise a feed hole plate comprising feed holes that extend through the feed hole plate, from an input surface of the feed hole plate to an opposing output surface of the feed hole plate; and a pin assembly comprising pins disposed on an output surface of the feed hole plate. One or more of the pins may comprise a head comprising alignment surfaces configured to align the pins, flow surfaces disposed between the alignment surfaces, and a tapered portion comprising a contact surface adhered to the output surface of the feed hole plate; a tail connected to the head and extending away from the feed hole plate; and optionally a first groove disposed between the head and the tail. The alignment surfaces of the pins may contact adjacent pins, such that the tails of adjacent pins are spaced apart to at least partially define discharge slots, and the flow surfaces of adjacent pins may be spaced apart to at least partially define channels. The pins may optionally be coated, e.g. hard coated, which may provide wear-resistance. By way of non-limiting example, the pins may be coated with titanium aluminum nitride (TiAlN), titanium carbon-nitride (TiCN), titanium nitride (TiN), hard chrome, or with an ultra-high molecular weight (UHMW) plastic material.

Methods and apparatuses for forming extrusion dies are also disclosed. One exemplary method comprises one or more steps of aligning pins on an output surface of a feed hole plate in a same direction as from an input surface of the plate to the output surface, and adhering the contact surfaces to the output surface of the feed hole plate. Optionally, the pins may be individually manufactured from barstock.

The aligning step may, for example, comprise disposing the pins in a jig disposed on the feed hole plate and biasing the pins together using the jig, such that the alignment surfaces of the pins contact adjacent pins and align the pins into a pin assembly. In various embodiments, the adhering may comprise any known method, including, without limitation, brazing, using an adhesive, or welding.

In at least one exemplary embodiment, the biasing may comprise biasing the pins in at least two different directions. In yet a further exemplary embodiment, the biasing may comprise biasing the pins towards the feed hole plate. For example, biasing the pins in at least two different directions and biasing the pins toward the feed hole plate.

Also disclosed is an assembly jig for an extrusion die comprising a feed hole plate and pins, the assembly jig comprising first guides, second guides respectively opposing the first guides, a compliant layer disposed between the first guides and the second guides, and a weight configured to bias the compliant layer towards the pins. The second guides may be configured to bias pins of the extrusion die towards the corresponding opposing first guides.

The extrusion dies, methods of forming extrusion dies, and apparatuses for forming extrusion dies may be more readily appreciated with reference to the exemplary embodiments illustrated in the drawings.

Figure 1B:
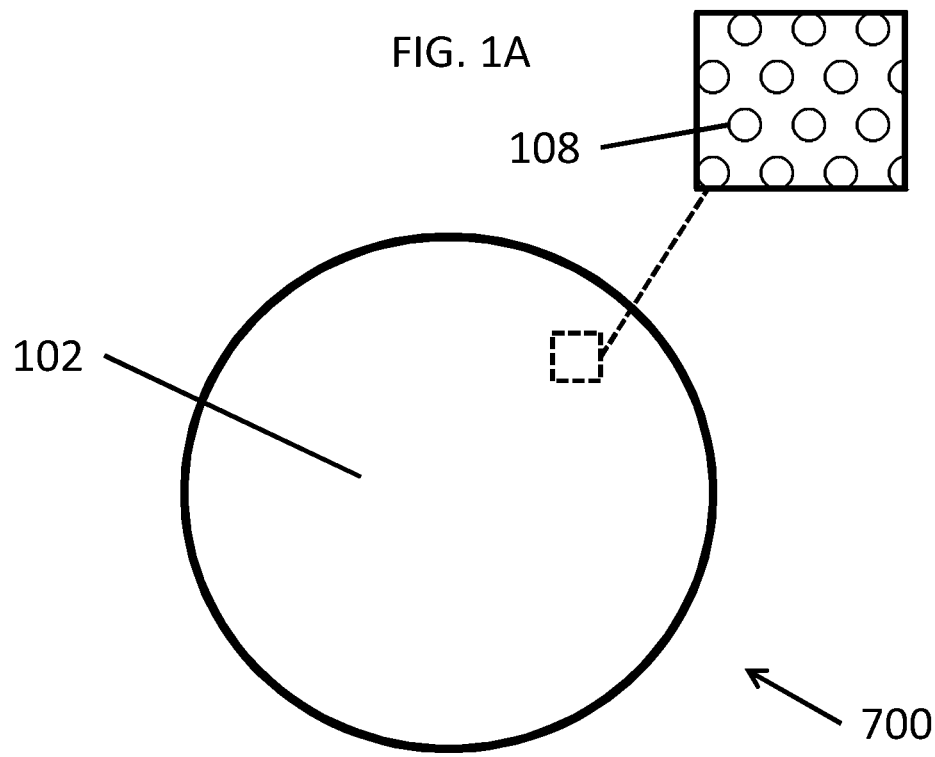
FIG. 1B is a plan view of an input surface of the die of FIG. 1A.

FIG. 1A is a perspective view of a honeycomb extrusion die 100 according to various embodiments of the present disclosure. FIG. 1B is a plan view of an input surface of the die 100 of FIG. 1A.

Referring to FIGS. 1A and 1B, the extrusion die 100 includes an input surface 102 and an opposing output surface 104. The output surface 104 includes a matrix of discharge slots 106 through which a batch material may be extruded from the die 100. While a square matrix of discharge slots 106 is shown, the present disclosure is not limited to any particular matrix geometry. For example, the matrix of discharge slots 106 may be hexagonal, asymmetrical, or the like. The discharge slots 106 may be formed between pins of the die 100, as discussed in detail below. The batch material may be, for example, a ceramic material (or ceramic precursor material) used to form a honeycomb body. However, the present disclosure is not limited to any particular type of batch material. The die 100 may also include a mask 110 configured to cover at least a portion of the output surface 104. In particular, the mask 110 may be configured to control the overall shape of an extruded product. While a circular mask 110 is shown, the present disclosure is not limited to any particular mask geometry.

The input surface 102 includes one or more feed holes 108 through which the batch material is fed into the die 100. The feed holes 108 may be arranged in any manner, for example a matrix. The feed holes 108 may face intersections of the discharge slots 106, as shown in the FIG. 2C. In various embodiments, the feed holes 108 may have any suitable geometry, e.g. may be round or non-round. In various embodiments, a non-round feed hole 108, for example a substantially square feed hole 108, substantially square feed hole 108 with rounded corners, a polygonal feed hole 108 with rounded corners, etc., may be chosen. The cross section of the feed holes is not particularly limited and may be a shape that is one of circular, elliptical, square, hexagonal, other polygonal, symmetrical, asymmetrical, and combinations thereof. For example, the feed holes may have a widthwise cross-section that has the shape of a hexagon with rounded corners. For example, the feed holes may have a widthwise cross-section that has convex or concave sides and rounded corners. However, the present disclosure is not limited to any particular arrangement or geometry of the feed holes 108.

FIG. 2A illustrates a partial perspective view of a portion of the die 100 of FIG. 1, according to various embodiments of the present disclosure. FIG. 2B illustrates a side view of the die portion of FIG. 2A, and FIG. 2C illustrates a top view taken through feed holes 108 of the die 100.

Referring to FIGS. 2A and 2B, the die 100 includes a feed hole plate 202 and a pin assembly 204 bonded to the feed hole plate 202. The pin assembly 204 includes a plurality of the pins 300 and forms the output surface 104 of the die 100. The discharge slots 106 are formed between portions of the pins 300.

The feed hole plate 202 includes the feed holes 108 and forms the input surface 102 of the die 100. In particular, the feed hole plate 202 includes an input surface 202A and an opposing output surface 202B. The feed hole plate 202 may be formed of a material that is sufficient strong enough to resist bowing and/or crowning during the extrusion of a batch material through the die 100. The feed holes 108 may be formed in the feed hole plate 202 by drilling, electrochemical machining, or by direct metal laser sintering. The feed holes 108 may extend through the feed hole plate 202, from the input surface 202A to the output surface 202B. The feed holes may be straight, substantially straight, or worm-like, e.g. variously curved or bent.

The pins 300 may be attached to the feed hole plate 202, as discussed below. The feed holes 108 may be formed prior to attaching the pins 300. As such, the manufacture of the feed hole plate 202 is simplified, as compared to wherein feed holes are formed in a plate, after pins are attached to the plate. In particular, it may be difficult to precisely form feed holes after attaching pins, due to, for example, drill bit wandering during drilling of feed holes.

Figure 2D:
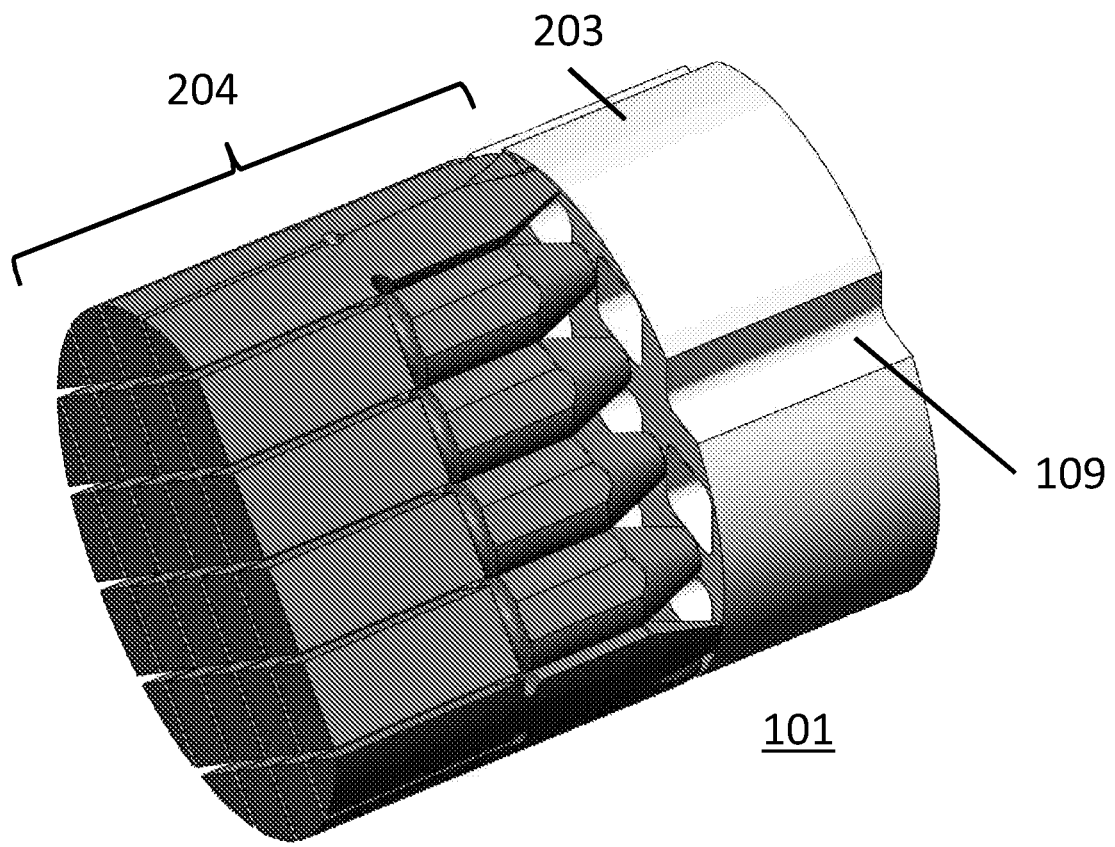
FIG. 2D is a perspective view of a portion of a modified version of the die of FIG. 1, according to various embodiments of the present disclosure.
Figure 2E:
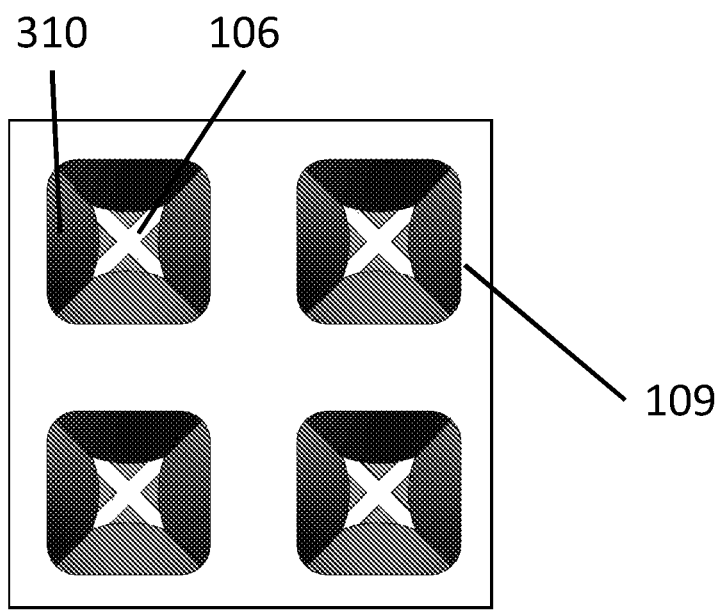
FIG. 2E is a plan view of a portion of the die of FIG. 2D.

FIG. 2D is a perspective view of a portion of a modified version 101 of the die 100 of FIG. 1, according to various embodiments of the present disclosure. FIG. 2E is a plan view of a portion of the die 101 of FIG. 2D. Accordingly, differences between the die 100 and the die 101 will be discussed in detail.

Referring to FIGS. 2D and 2E, the die 101 includes the pin assembly 204, which is bonded to a feed hole plate 203. In contrast to the feed hole plate 202, the feed hole plate 203 includes feed holes 109 that are generally rectangular. In particular, the feed holes 109 may have a widthwise cross-section that has the shape of a rectangle with rounded corners. This configuration may reduce back-pressure in the die 101.

Figure 3A:
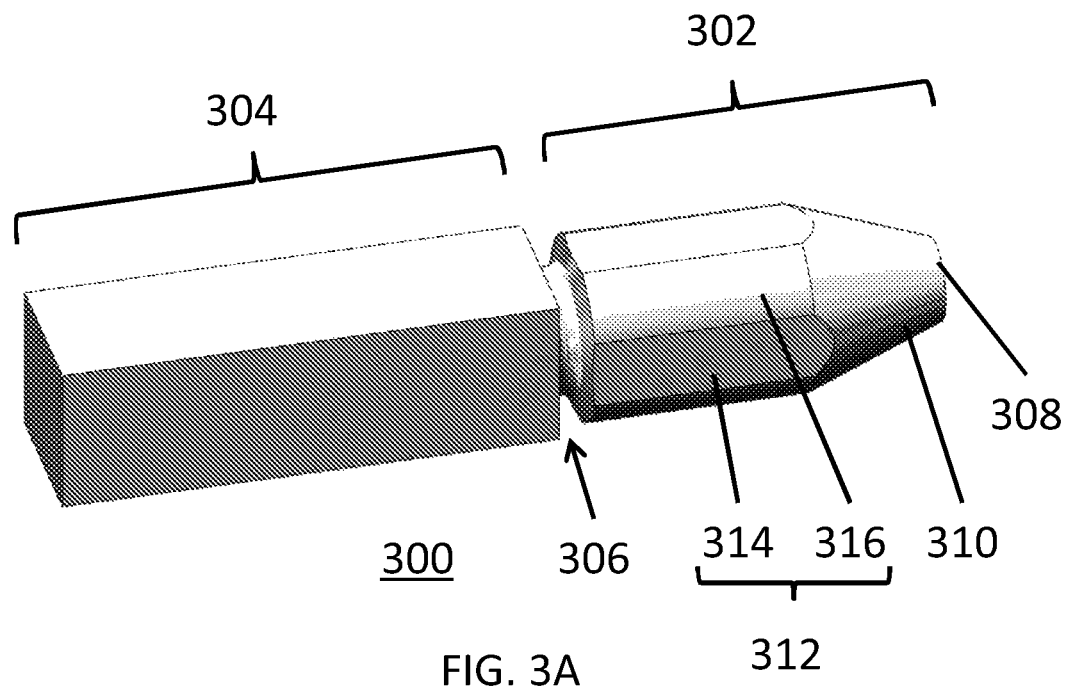
FIG. 3A is a perspective view of a pin of an extrusion die, according to various embodiments of the present disclosure.
Figure 3B:
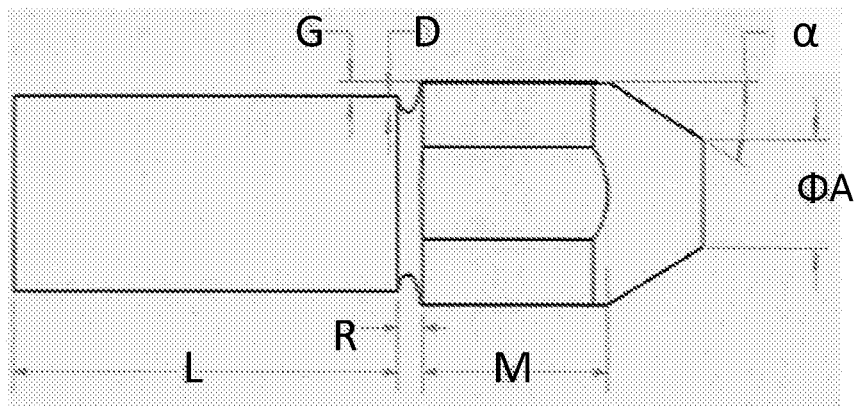
FIGS. 3B and 3C respectively illustrate a side view and a plan view of the pin of FIG. 3A.
Figure 3C:
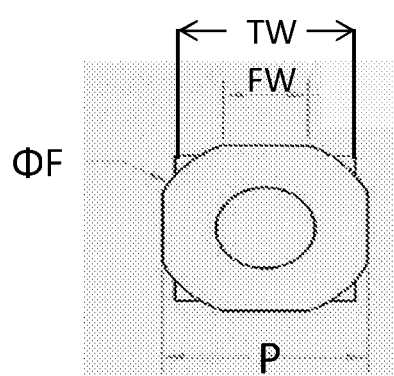

FIG. 3A illustrates a perspective view of a pin 300 of the pin assembly 204, and FIGS. 3B and 3C respectively illustrate a side view and a top view of the pin 300. Referring to FIGS. 3A-3C, each pin 300 includes a head 302, a tail 304, and a groove 306 disposed between the head 302 and the tail 304. In some embodiments, the pin 300 may include a head 302 and a tail 304 with no groove therebetween. The tail 304 may be generally rectangular, so as to produce an extrusion product having rectangular cells. However, the present disclosure is not limited to any particular tail geometry. For example, the tail 304 may be triangular, hexagonal, or the like, depending on the cell geometry of a desired extruded product.

The head 302 may be tapered so as to be generally cone-shaped, pyramidal-shaped, bullet-shaped, pencil-shaped, or the like. The head 302 includes a base 312, a tapered portion 310 that extends from the base 312 and ends in a contact surface 308. The base 312 may be generally cylindrical, according to various embodiments. However, the present disclosure is not limited to any particular base geometry. The base 312 may include flat or substantially flat alignment surfaces 314 that are separated from one another by flow surfaces 316. The flow surfaces 316 may be, in various embodiments, substantially flat or may be curved, for example either concave or convex. According to some embodiments, the alignment surfaces 314 may be formed by milling using an abrasive wheel. However, any suitable method may be used. Herein, "substantially flat" refers to a surface that is generally planar or within general machining tolerances of being planar. Herein, "curved" as used with respect to surfaces relates to surfaces having a radius of curvature of greater than zero. For example, the flow surfaces 316 may correspond to circular or ellipsoidal arcs.

The tapered portion 310 may be generally conical, for example, the tapered portion 310 may be frusto-conical. However, the tapered portion 310 may have other geometries, such as pyramidal, so long as the size of tapered portion 310 is reduced in a direction extending towards the contact surface 308. As shown in FIG. 3C, when the tapered portion 310 is conical, the contact surface 308 may be circular. However, the present disclosure is not limited to any particular geometry. For example, the contact surface 308 may be triangular, rectangular, pentagonal, or the like, according to the geometry of the tapered portion 310.

According to various embodiments, a width P of the head 302, as measured between opposing alignment surfaces 314, may be larger than a width TW of the tail 304 as measured between corresponding opposing surfaces of the tail 304. Accordingly, as shown in FIG. 3C, in a top view, only corners of the tail 304 are visible past the flow surfaces 316 of the base 312.

For example, the width P may range from about 0.03 to about 0.05 inches, and the width TW may range from about 0.25 to about 0.045 inches. In some embodiments, the width P may be about 0.04 inches and the width TW may be about 0.035 inches. The value of width P may be determined according to the desired cell density of an extruded product. The following Table 1 includes exemplary values for width P and corresponding cell densities of an extruded product.

TABLE 1

| Cell density (cells/in$^2$) | P (in) |
|---|---|
| 100 | 0.1000 |
| 200 | 0.0707 |
| 300 | 0.0577 |
| 400 | 0.0500 |
| 500 | 0.0447 |
| 600 | 0.0408 |
| 700 | 0.0378 |
| 800 | 0.0354 |
| 900 | 0.0333 |
| 1000 | 0.0316 |

The value of measurement G may be set according to a desired wall thickness of the extruded product. Typical values for measurement G may range from about 0.0005" to about 0.005". Typical values for base diameter A may range from about 0.015" to about 0.030". Typical values for measurement L may range from about 0.05" to about 0.25". Typical values for angle alpha may range from about 15 degrees to about 45 degrees. Typical values of diameter F may range from about 0.030" to about 0.060". Typical values of measurement R may range from about 0.002" to about 0.012". Typical values for measurement D may range from 0.001" to about 0.008". However, it is understood, that any values are intended to be within the scope of the disclosure, without being in any way limited to those exemplified above and in Table 1.

Referring to FIGS. 2A-2C, in the die 100, the pins 300 are arranged together to form the pin assembly 204. In particular, the pins 300 are arranged such that the alignment surfaces 314 of adjacent pins 300 are disposed on one another. For example, the pins 300 may be disposed in a die and pressed together, as discussed in detail below. The alignment surfaces 314 facilitate the proper spacing and/or arrangement of the pins 300. In addition, since the width P between alignment surfaces 314 of each pin 300 is greater than the width of the tail 304, the alignment surfaces 314 also ensure that the tails 304 are uniformly spaced, thereby uniformly forming the discharge slots 106 between the tails 304.

According to some embodiments, the pins 300 and the feed holes 108 may be aligned with an axis A extending through the die 100. For example, the axis A may extend substantially perpendicularly to the input and output surfaces 102, 104 of the die 100, and long axes of the pins 300 and the feed holes 108 may be substantially parallel to the axis A.

The contact surfaces 308 of the pins 300 may be adhered to the output surface 202B of the feed hole plate 202. For example, the contact surfaces 308 may be brazed, welded (e.g. electro-welded), or adhered using an adhesive, to the output surface 202B of the feed hole plate 202. According to some embodiments, a braze may be applied to the feed hole plate 202, the pin assembly 204 may be positioned on the feed hole plate 202, and then the die 100 may be heated to attach the pin assembly 204 to the feed hole plate 202.

The contact surfaces 308 may be positioned on the output surface 202B between adjacent feed holes 108. Accordingly, a width (e.g., diameter) of each contact surface 308 may be less than a distance between the adjacent feed holes 108. In other words, the contact surfaces 308 are configured so as not to block and/or cover the feed holes 108. The die 100 may optionally include more pins 300 than feed holes 108. For example, according to some embodiments, the die 100 may include from 1 to 2 times as many pins 300 as feed holes 108. In some embodiments, the die 100 may include a ratio of pins 300 to feed holes 108 of 1:1 or 2:1.

According to some embodiments, the tapered portions 310 of the pins 300 form a first plenum 320 with the output surface 202B of the feed hole plate 202. The first plenum 320 is configured to receive a batch material fed through the feed holes 108. In particular, the first plenum 320 is configured to uniformly distribute the batch material inside of the die 100. In other words, as shown in FIG. 2C, the batch material exiting the feed holes 108 contacts the tapered portions 310 of adjacent pins 300 and is thereby distributed in the first plenum 320.

The batch material passes from the first plenum 320 into channels 321 formed between the flow surfaces 316 of the pins 300, and then into a second plenum 322 at least partially formed by the grooves 306 of the pins 300. The second plenum 322 operates to collect and further distribute the batch material. The batch material then flows into the discharge slots 106 and is expressed (extruded) from the die 100 in a desired shape, such as a honeycomb body.

Figure 4A:
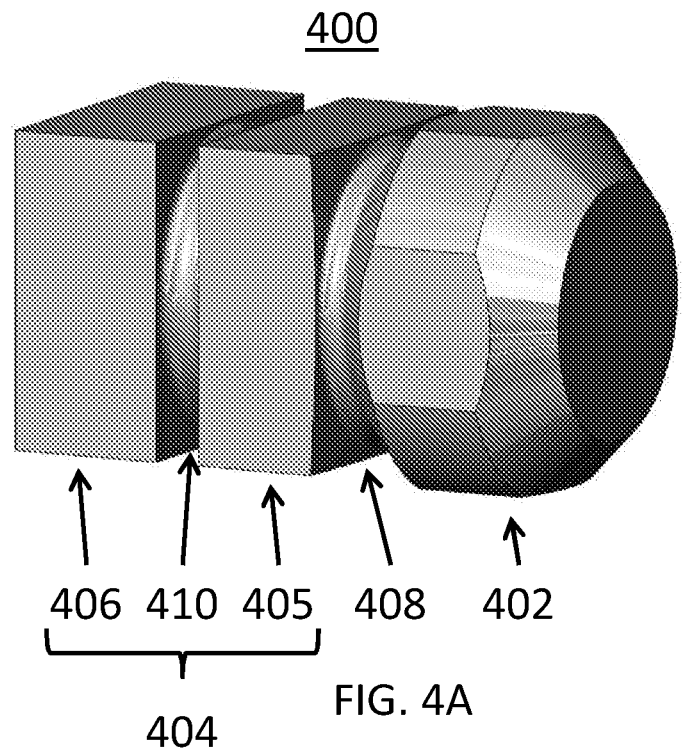
FIG. 4A is a perspective view of a pin according to various embodiments of the present disclosure.
Figure 4B:
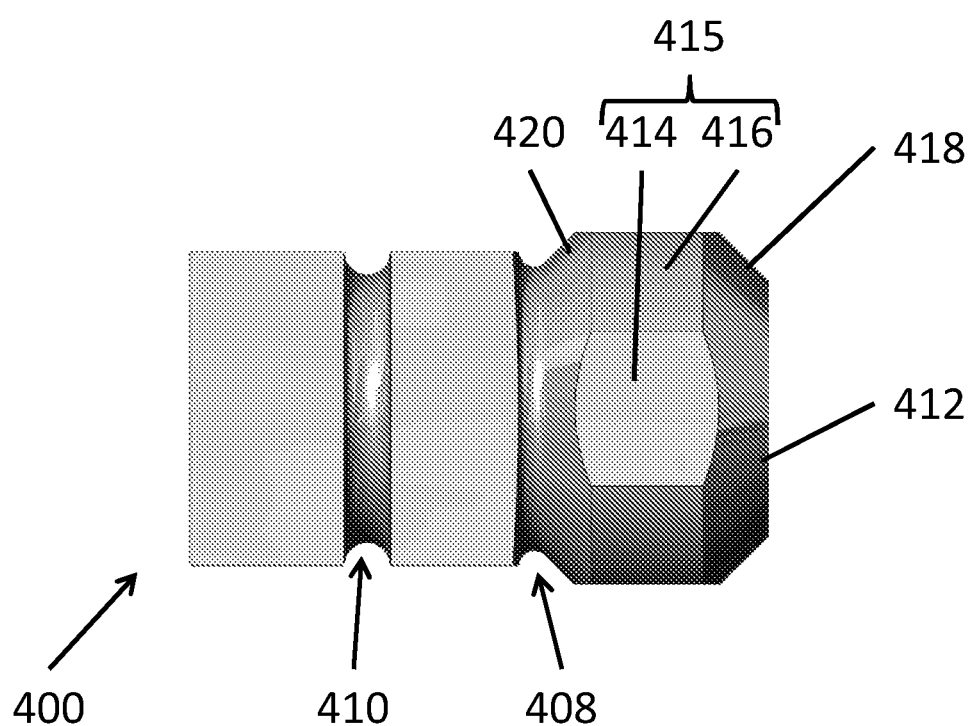
FIG. 4B is a side view of the pin of FIG. 4A.

FIGS. 4A and 4B respectively illustrate perspective and side views of a pin 400, according to various embodiments of the present disclosure. Referring to FIGS. 4A and 4B, the pin 400 includes a head 402, a tail 404, and a first groove 408. The first groove 408 is disposed between the head 402 and the tail 404.

The head 402 includes a contact surface 412, a first tapered portion 418, a base 415, and a second tapered portion 420. The base 415 includes alignment surfaces 414 and flow surfaces 416. The first tapered portion 418 extends from the contact surface 412 to a first side of the base 415. The second tapered portion 420 extends from an opposing second side of the base 415, and may form a portion of the first groove 408.

The tail 404 includes a first body 405, a second body 406, and a second groove 410. The tail 404 may be substantially rectangular, e.g., the first and second bodies 405, 406 may be rectangular, and the groove 410 may be circular. However, the present disclosure is not limited to any particular geometry. For example, the first and second bodies 405, 406 may be triangular, hexagonal, or the like, depending on the cell geometry of a desired extruded product.

FIG. 5A is a perspective view of a honeycomb extrusion die 500 including pins 400 of FIGS. 4A and 4B. FIG. 5B illustrates an enlarged portion of FIG. 5A, and FIG. 5C illustrates a top view through feed holes of the die 500. The die 500 is similar to the die 100, differences therebetween will be discussed in detail.

Referring to FIGS. 4A, 4B, and 5A-5C, the die 500 includes a feed hole plate 502 including feed holes 508, an input surface 502A and an opposing output surface 502B, and a pin assembly 504 including a plurality of the pins 400 attached to the feed hole plate 502. The pins 400 are arranged such that the alignment surfaces 414 of adjacent pins 400 are disposed on one another, for example, directly on one another. As such, discharge slots 506 may be formed between the tails 404 of the pins 400, and may lead to an exit surface of the die 500. In addition, channels 521 may be at least partially defined between flow surfaces 416 of the pins 400.

The die 500 includes a first plenum 520, a second plenum 522, and a third plenum 524. The first plenum 520 is at least partially formed by the first tapered portions 418 of the pins 400. The second plenum 522 is at least partially formed by the second tapered portions 420 and the first grooves 408. The channels 521 connect the first and second plenums 520, 522. The third plenum 524 is at least partially formed by the second grooves 410 and is included in the discharge slots 506. The contact surfaces 412 of the pins 400 are configured to be disposed between the feed holes 508 on the output surface 502B.

Accordingly, a batch material fed through the feed holes 508 contacts the tapered portions 418 of the pins 400 and is distributed within the first plenum 520. The batch material passes through the channels 521 formed between the flow surfaces 416 of the pins 400, and is distributed in the second plenum 522. The batch material passes between the first bodies 405 of the tails 404 of the pins 400 and enters the third plenum 524 and is distributed therein. The batch material passes from the third plenum 524 and into the discharge slots 506, where the batch material is expressed from the die 500. As such, the plenums 520, 522, 524 are configured to ensure that the batch material is consistently distributed in the die 500, such that the batch material forms a consistent product when expressed from the die 500.

Figure 6:
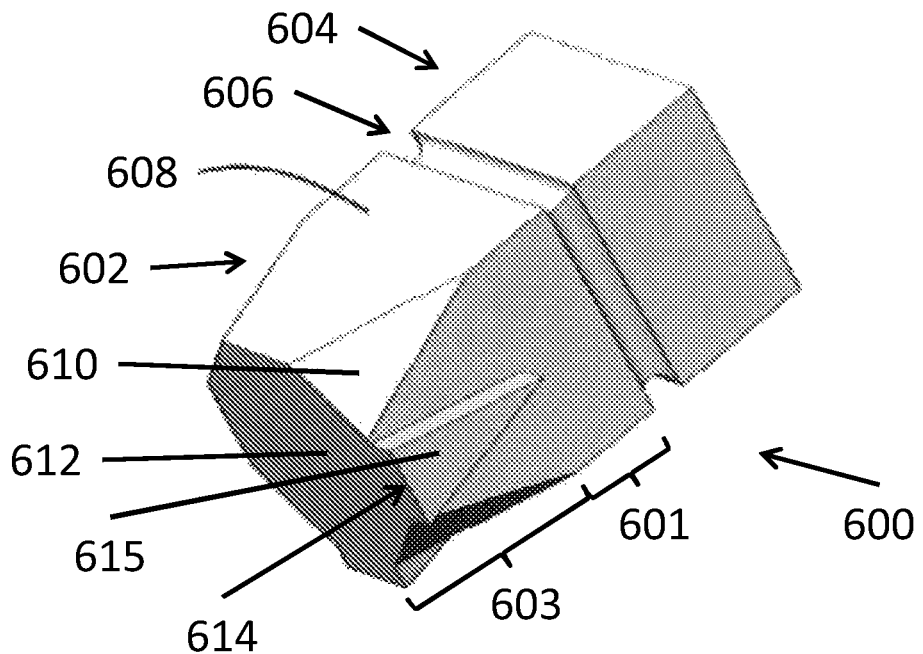
FIG. 6 a perspective view of a pin according to various embodiments of the present disclosure.

FIG. 6 illustrates a perspective view of pin 600 of an extrusion die, according to various embodiments of the present disclosure. Referring to FIG. 6, the pin 600 includes a head 602, a tail 604, and a groove 606 disposed between the head 602 and the tail 604. The tail 604 may be substantially rectangular, so as to produce an extrusion product having rectangular cells. However, the present disclosure is not limited to any particular tail geometry. For example, the tail 604 may be triangular, hexagonal, or the like, depending on the cell geometry of a desired extruded product. Further the pins may be of alternating size to provide asymmetric cell geometries in the product to be extruded.

The head 602 includes first flow surfaces 608, second flow surfaces 610, a contact surface 612, and bosses 614. The contact surface 612 may have any shape, so long as the contact surface 612 is configured to fit between adjacent feed holes of an output surface of a feed hole plate. The second flow surfaces 610 may be configured to taper the head 602. As such, the second flow surfaces 610 may operate to reduce the size of the contact surface 612, such that the area of the contact surface 612 is smaller than the area of an opposing surface the tail 604, such as an exit surface of the tail 604 where a batch material is expressed. Accordingly, the portion of the head 602 that is reduced in size (tapered) by the second surfaces 610 may be referred to as a tapered portion 603, and the remaining portion of the head 602 may be referred to as a base 601.

The first flow surfaces 608 may be co-planar with corresponding surfaces of the tail 604. However, according to some embodiments, the first flow surfaces 608 may be angled so as to taper the head 602. The bosses 614 may be disposed on all of the first flow surfaces 608. However, as shown in FIG. 6, the bosses 614 may be disposed on only some of the first flow surfaces 608. For example, in some embodiments, the bosses 614 may be disposed on half of the first flow surfaces 608. For example, in the pin 600, the bosses 614 are disposed on two of four first flow surfaces 608. In some embodiments, the bosses 614 may be disposed on adjacent first flow surfaces 608. However, the bosses 614 may be disposed on opposing first flow surfaces 608, according to some embodiments. Including bosses 614 on only some of the first surfaces may reduce manufacturing time and cost.

The bosses 614 are configured to contact the first surfaces 608 of adjacent pins 600 of a pin assembly. In particular, the bosses 614 may each comprise an alignment surface 615 that is configured to contact an adjacent pin 600. As such, the bosses 614 operate to align and properly space the pins 600 in a pin assembly. The pins 600 may be arranged such that the alignment surfaces 615 of the bosses 614 contact the first flow surfaces 608 of adjacent pins 600 that do not include bosses 614. In other words, the pins may be arranged such that the alignment surfaces 615 of the bosses 614 directly contact the first flow surfaces 608 of adjacent pins. However, in embodiments where bosses 614 are disposed on all of the first flow surfaces 608, the pins 600 may be aligned such that the bosses 614 of adjacent pins 600 contact each other.

Figure 7B:
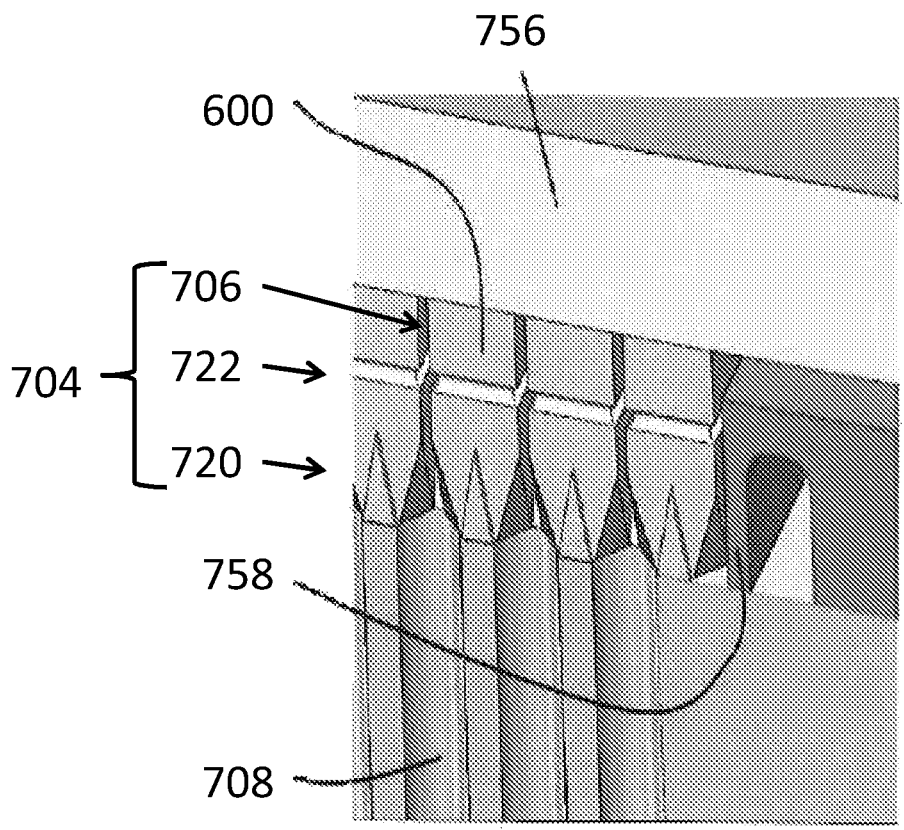
FIG. 7B is an enlarged view of a portion of FIG. 7A.
Figure 7A:
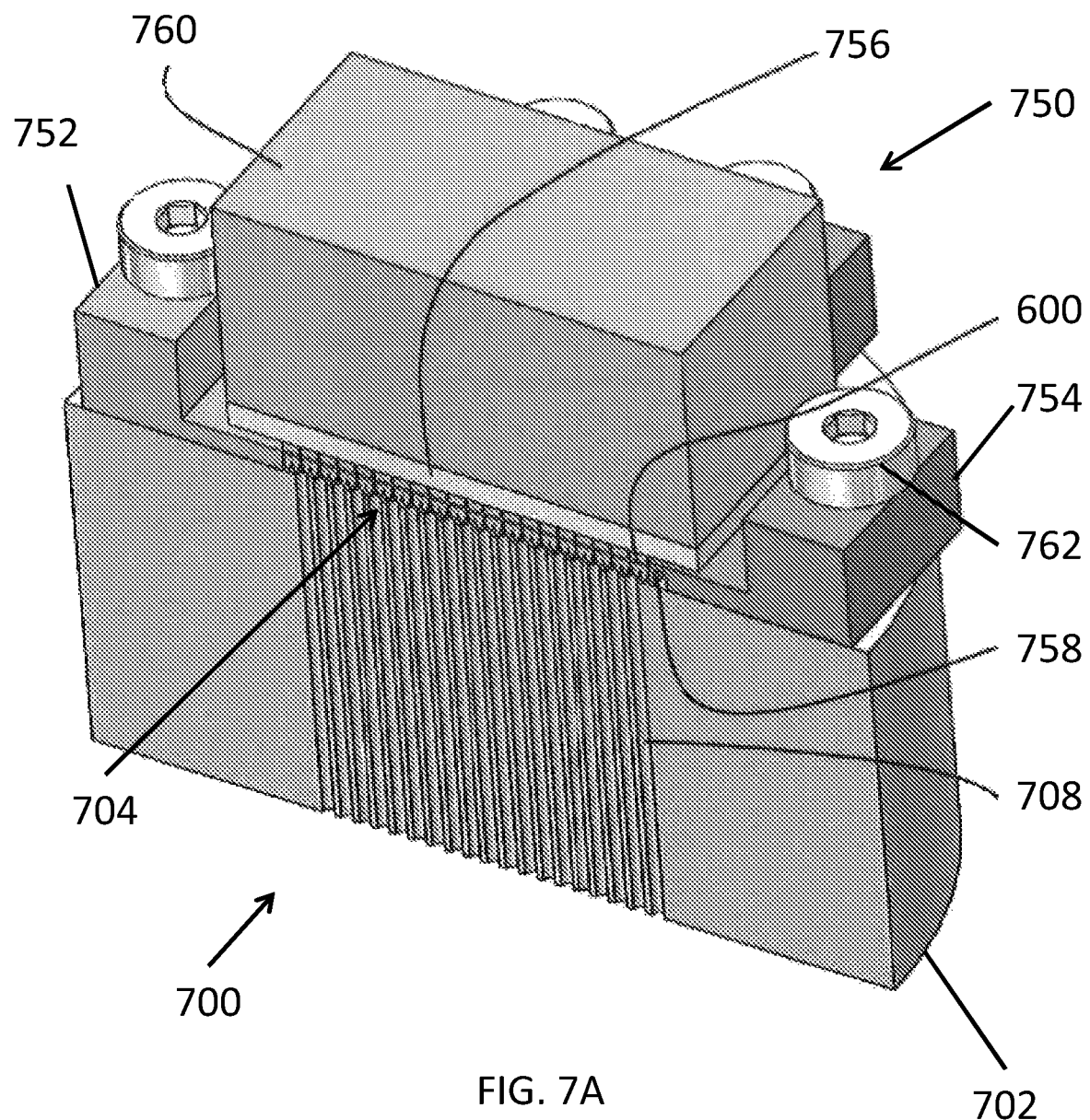
FIG. 7A is a partial perspective view of an extrusion die disposed in an assembly jig, according to various embodiments of the present disclosure.

FIG. 7A illustrates a sectional view of an extrusion die 700 disposed in an assembly jig 750, according to various embodiments of the present disclosure. FIG. 7B illustrates an enlarged view of a portion of FIG. 7A.

Referring to FIGS. 7A and 7B, the die 700 includes a feed hole plate 702 and a pin assembly 704 that includes the pins 600. The jig 750 includes first guides 752, second guides 754, a compliant layer 756, and a weight 760. The jig 750 is disposed on the feed hole plate 702, and is configured to arrange the pins 600 to properly form the pin assembly 704, and to align the pin assembly 704 with respect to the feed hole plate 702.

In particular, the first guides 752 may be fixed, and the second guides 754 may be moveable, so as to be configured to bias the pins 600 towards the opposing first guides 752. As such, the second guides 754 may bias the pins 600 in first and second substantially orthogonal directions. However, according to some embodiments, both the first and the second guides 752, 754 may be configured to be moveable to bias the pins 600 in a particular direction. Further, according to some embodiments, one first guide 752 and one second guide 754 may alternately bias the pins 600 in first and second substantially orthogonal directions.

The positions of the first and/or second guides 752, 754 may be fixed and/or adjusted, using adjustment screws 762. The second guides 754 may include flexures 758. The flexures 758 are configured to apply a substantially uniform biasing force against the pins 600, and to maintain the biasing force when the second guides 754 are fixed in position. According to some embodiments, the first guides 752 may include flexures.

The weight 760 is configured to bias the pins 600 towards the feed hole plate 702. The compliant layer 756 operates as a buffer between the pins 600 and the weight 760, and may operate to normalize the force applied by the weight 760 to the pins 600. The compliant layer 756 may be formed of a compliant material configured to withstand high temperatures. For example, the compliant layer 756 may be formed of material comprising alumino-silicate fibers, such as a Fiberfrax material available from Unifrax Corp.

Once the pins 600 are properly aligned, the pins 600 are adhered to the feed hole plate. In particular, the jig 750 and the die 700 may be heated, such that a braze applied to the feed hole plate 702 liquefies and is drawn between the contact surfaces 612 of the pins 600 and the output surface of the feed hole plate 702. The jig 750 and the die 700 may then be allowed to cool, thereby solidifying the braze, and adhering the pins 600 to the feed hole plate 702 and completing the die 700. According to some embodiments, the braze may be applied to an entire surface of the feed hole plate 702, the braze may be applied to the contact surfaces 612 of the pins 600, or the braze may be applied to both the feed hole plate 702 and the contact surfaces 612. The braze may be applied prior to assembling the pins 600, according to some embodiments.

According to various embodiments, the jig 750 may be used to adhere any of the pins described herein to a corresponding feed hole plate. For example, the pins 300 and the pins 400 may be adhered to corresponding feed hole plates using the jig 750. However, the present disclosure is not limited to any particular method of pin attachment. For example, pins may be adhered using an adhesive, electro-welding, or the like, according to some embodiments.

Further, according to some embodiments, the pins may also be adhered to one another. For example, with regard to the pins 300, the alignment surfaces 314 of adjacent pins 300 may be adhered to one another, and with regard to the pins 400, the alignment surfaces 414 of adjacent pins 400 may be adhered to one another. Further, the bosses 614 of pins may be adhered to the first feed surfaces 608 of adjacent pins 600, or the bosses 614 of adjacent pins may be adhered to one another, according to various embodiments. The adhesion of pins to one another may improve the strength of a corresponding extrusion die.

The pins 600 of the pin assembly 704 are disposed on the feed hole plate 702, such that the bosses 614 separate the first flow surfaces 608 of adjacent pins. The bosses 614 also operate to separate the tails 604 of the pins 600, such that the tails 604 at least partially define discharge slots 706 of the die 700. The contact surfaces 612 are disposed between the feed holes 623. The contact surfaces 612 may be configured so as not to cover the feed holes 708.

Accordingly, a batch material fed through the feed holes 708 is guided by the flow surfaces 608, 610 to the discharge slots 706. In particular, the die 700 may include a first plenum 720 that is at least partially defined by the second feed surfaces 610, and a second plenum 722 at least partially defined by the grooves 606. The batch material may be received from the feed holes 708, may be distributed in the die 700 by the first plenum 720 and the second plenum 722, prior to being expressed from the die 700 through the discharge slots 706, as a honeycomb body.

Figure 8A:
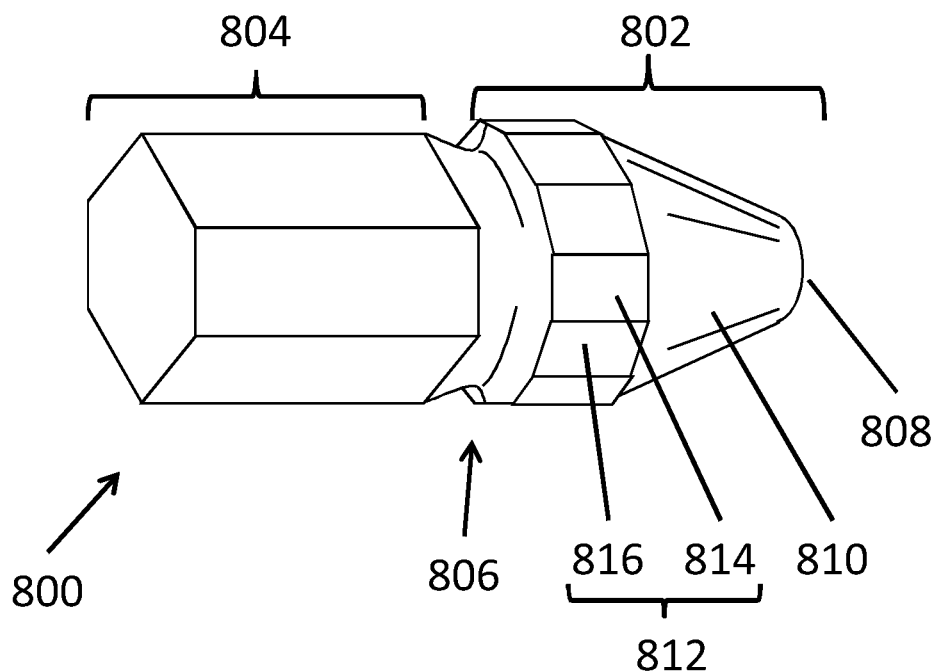
FIG. 8A illustrates a perspective view of a pin according to various embodiments of the present disclosure.

FIG. 8A illustrates a perspective view of a pin 800, and 8B illustrates a perspective view of a honeycomb extrusion die 900 including a plurality of the pins 800, according to various embodiments of the present disclosure. The pin 800 and the die 900 may be similar to the pin 300 and die 100 discussed above, except for the shapes of a base 812 and a tail 804 of the pin 800. Accordingly, the differences there between will be discussed in detail.

Figure 8B:
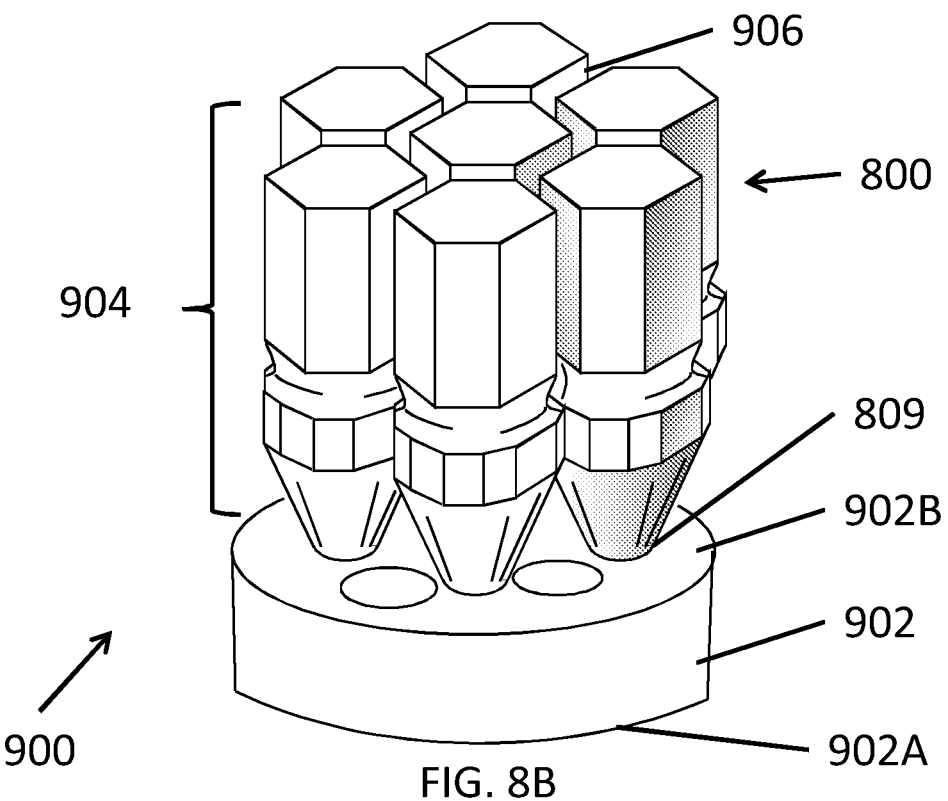
FIG. 8B illustrates an extrusion die including the pin of FIG. 8A.

Referring to FIGS. 8A and 8B, the pin 800 includes a head 802, the tail 804, and a groove 806 disposed between the head 802 and the tail 804. The tail 804 may be generally hexagonal in cross-section, so as to produce an extrusion product having hexagonal cells.

The head 802 may be tapered so as to be generally cone-shaped, pyramidal-shaped, bullet-shaped, pencil-shaped, or the like. The head 802 includes the base 812, a tapered portion 810 that extends from the base 812 and ends in a contact surface 808. The base 812 may be generally cylindrical, according to various embodiments. However, the present disclosure is not limited to any particular base geometry. The base 812 may include substantially flat alignment surfaces 814 that are separated from one another by flow surfaces 816. According to some embodiments, the alignment surfaces 814 may be formed by milling using an abrasive wheel. However, any suitable method may be used.

The tapered portion 810 may be generally conical, for example, the tapered portion 810 may be frusto-conical. However, the tapered portion 810 may have other geometries, such as being pyramidal, so long as the size of tapered portion 810 is reduced in a direction extending towards the contact surface 808. When the tapered portion 810 is conical, the contact surface 808 may be circular. However, the present disclosure is not limited to any particular geometry. For example, the contact surface 808 may be triangular, rectangular, pentagonal, or the like, according to the geometry of the tapered portion 810.

In the die 900, the pins 800 are arranged together to form a pin assembly 904, which is disposed on a feed hole plate 902 having an input surface 902A and an opposing output surface 902B. In particular, the pins 800 are arranged such that the alignment surfaces 814 of adjacent pins 800 are disposed on one another, e.g., directly on one another. For example, the pins 800 may be disposed in a jig and pressed together, as discussed above. The alignment surfaces 814 facilitate the proper spacing and/or arrangement of the pins 800. In addition, the alignment surfaces 814 also ensure that the tails 804 are uniformly spaced, thereby uniformly forming discharge slots 906 between the tails 804. In particular, the discharge slots 906 form a hexagonal discharge pattern. Such a discharge pattern may be more difficult to form using conventional methods, such as WEDM, plunge EDM, or AWS.

The contact surfaces 808 of the pins 800 may be attached to the feed hole plate 902. For example, the contact surfaces 808 may be brazed, welded, or adhered to the output surface 902B of the feed hole plate 902. According to some embodiments, a braze may be applied to the feed hole plate 902, the pin assembly 904 may be positioned on the feed hole plate 902, and then the die 900 may be heated to attach the pin assembly 904 to the output surface 902B of the feed hole plate 902. According to some embodiments as described herein, the extrusion die 900 comprises a feedhole plate 902, a pin assembly 904, and a joint 809 between the feed hole plate 902 and each pin 800 of the pin assembly 904 where the pin assembly is joined to the output surface 902B of the feed hole plate 902.

As set forth herein, various aspects of the disclosure are described with reference to the exemplary embodiments and/or the accompanying drawings in which exemplary embodiments of the invention are illustrated. This invention may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will also be understood that when an element or layer is referred to as being disposed "on" or "connected to" another element or layer, it can be disposed directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will also be understood that, as used herein the terms "the," "a," or "an," mean "at least one," and should not be limited to "only one" unless explicitly indicated to the contrary. Thus, for example, reference to "a slot" includes examples having two or more slots unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not expressly recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a structure that comprises A+B+C include embodiments where a structure consists of A+B+C and embodiments where a structure consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Example is intended to be non-restrictive and illustrative only, with the scope of the invention being defined by the claims.

MANUFACTURING EXAMPLE

Figure 9B:
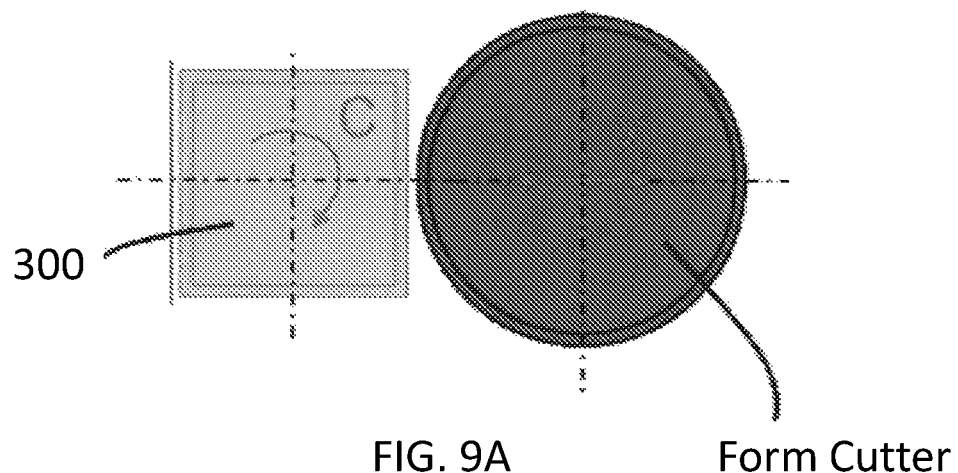
Figure 9B:
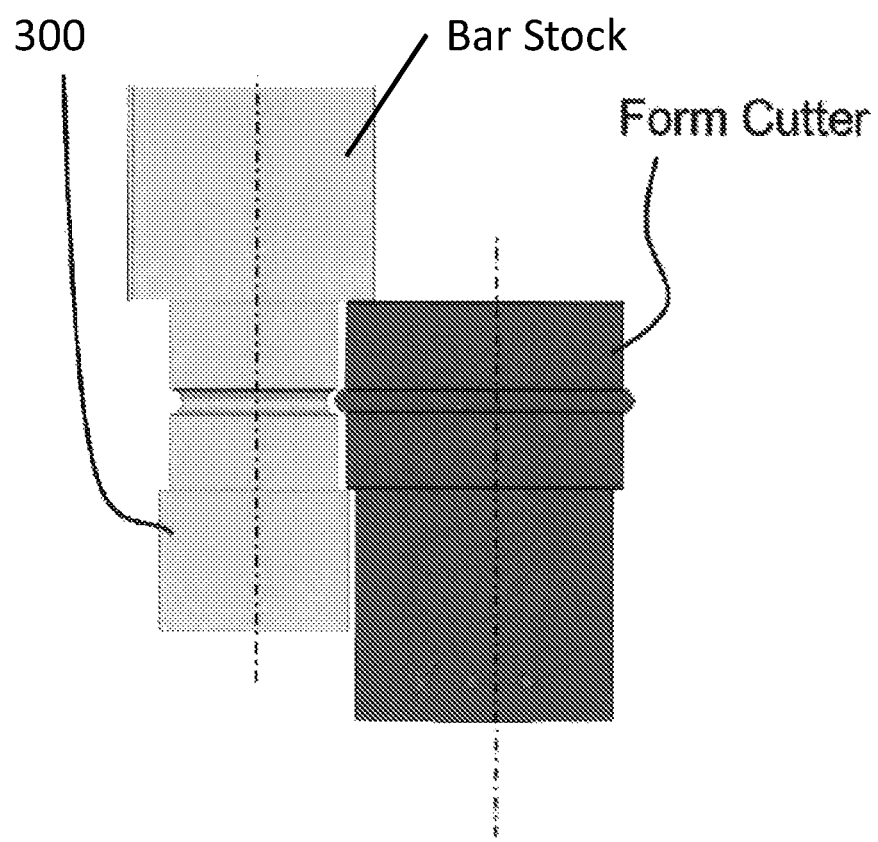

FIGS. 9A and 9B respectively illustrate top and side views of a method of manufacturing the pins 300 shown in FIGS. 3A-3C. Referring to FIGS. 3C, 9A, and 9B, the pins 300 were manufactured using bar stock and an abrasive wheel form cutter. The majority of the machining of the pins 300 was accomplished by holding the bar stock in a spindle having precise C-axis angular motion capability, with the form cutter traversed in the X-axis direction and spun at high rotational rates. The X-axis and C-axis motions were coordinated to produce rectangular and flat profiles of the pin 300.

According to various embodiments pins of an extrusion die may be individually formed using various methods. For example, pins can be individually formed from a bar stock using an abrasive wheel. In the alternative, pins can be manufactured using direct metal laser sintering, lost cast processes, or the like. As such, each pin may be examined before inclusion in an extrusion die. Further, individually forming each pin using such a method allows for the formation of pin geometries that are not possible using conventional methods, wherein a plurality of pins are formed concurrently, by cutting grooves into a metal sheet.

Accordingly, the present disclosure provides extrusion dies that may be manufactured with a finish that is similar to a milling-type finish. In contrast, conventional pin forming methods, such as using wire EDM and plunge EDM result in finishes that are about 5× rougher.

According to various embodiments, the present disclosure allows for an extrusion die to be manufactured in less time than conventional methods. The present disclosure also reduces manufacturing costs. For example, an extrusion die may be manufactured at one third the cost of a similar die manufactured by machining precision slots in a monolithic plate to form pins.

Further, the present disclosure allows for pins to be manufactured with a more flexible geometry, i.e., geometries not possible using conventional techniques. The present disclosure also allows for the measurement of internal pin geometries without disassembling a die. Further, the present disclosure allows for improved die reusability, since worn pins may be individually replaced.

In addition, since the present disclosure allows for a feed hole plate to be manufactured separately from pins, the pins can be precisely located with respect to the feed holes. On the contrary, drilling feed holes in a feed hole plate having attached pins requires precise drilling techniques or machining of pins on an output side of a feed hole plate also requires precise drilling and machining techniques on a bulk die.

What is claimed is:

1. A honeycomb extrusion die comprising:
a feed hole plate comprising feed holes that extend through the feed hole plate, from an input surface of the feed hole plate to an opposing output surface of the feed hole plate; and
a pin assembly comprising pins disposed on an output surface of the feed hole plate, one or more of the pins comprising:
a head comprising alignment surfaces configured to align the pins, flow surfaces disposed between the alignment surfaces, and a tapered portion comprising a contact surface adhered to the output surface of the feed hole plate, wherein the contact surface is spaced axially from the alignment surfaces by the tapered portion, wherein the contact surface comprises a first cross-sectional width that is less than or equal to a distance between adjacent feed holes, such that the contact surfaces do not overlap the feed holes, and wherein a second cross-sectional width between opposing alignment surfaces is greater than the first cross-sectional width, such that the head is tapered by the tapered portion from the second cross-sectional width at the alignment surfaces to the first cross-sectional width at the contact surface;
a tail connected to the head and extending away from the feed hole plate; and
a first groove disposed between the head and the tail,
wherein the alignment surfaces of the pins contact adjacent pins, such that the tails of adjacent pins are spaced apart to at least partially define discharge slots, and the flow surfaces of adjacent pins are spaced apart to at least partially define channels.

2. The honeycomb extrusion die of claim 1, wherein in each pin:
the head comprises a base comprising the alignment surfaces and the flow surfaces; and
the tapered portion extends from the base and ends at the contact surface.

3. The honeycomb extrusion die of claim 1, wherein the discharge slots are disposed in a honeycomb pattern.

4. The honeycomb extrusion die of claim 1, wherein, in one or more of the pins, a width of the head, taken between opposing alignment surfaces, is greater than a width of the tail taken between corresponding opposing sides of the tail.

5. The honeycomb extrusion die of claim 1, wherein:
the flow surfaces are curved; and
the alignment surfaces are substantially flat.

6. The honeycomb extrusion die of claim 1, wherein the pin assembly comprises a first plenum at least partially defined by the tapered portions of the pins.

7. The honeycomb extrusion die of claim 6, wherein:
the pin assembly further comprises a second plenum at least partially defined by the first grooves; and
the channels between the flow surfaces are configured to guide the batch material from the first plenum to the second plenum.

8. The honeycomb extrusion die of claim 7, wherein:
one or more of the tails comprises a second groove; and
the pin assembly comprises a third plenum at least partially defined by the second grooves.

9. The honeycomb extrusion die of claim 1, wherein a ratio of the pins to the feed holes is 1:1 or 2:1.

10. The honeycomb extrusion die of claim 1, wherein the contact surface adhered to the plate comprises a braze joint, a weld joint, or an adhesive joint.

11. A method of forming a honeycomb extrusion die, the method comprising:
aligning pins on an output surface of a feed hole plate comprising feed holes that extend through the feed hole plate, from an input surface of the plate to the output surface, one or more of the pins comprising:

a head comprising alignment surfaces configured to align the pins, flow surfaces disposed between the alignment surfaces, and a tapered portion comprising a contact surface adhered to the output surface of the feed hole plate, wherein the contact surface is spaced axially from the alignment surfaces by the tapered portion, wherein the contact surface comprises a first cross-sectional width that is less than or equal to a distance between adjacent feed holes, such that the contact surfaces do not overlap the feed holes, and wherein a second cross-sectional width between opposing alignment surfaces is greater than the first cross-sectional width, such that the head is tapered by the tapered portion from the second cross-sectional width at the alignment surfaces to the first cross-sectional width at the contact surface;

a tail connected to the head and extending away from the feed hole plate; and a first groove disposed between the head and the tail; and adhering the contact portions to the output surface of the feed hole plate.

12. The method of claim 11, wherein the aligning comprises:

disposing the pins in a jig on the feed hole plate; and biasing the pins together using the jig, such that the contact surfaces of the pins contact adjacent pins and align the pins into a pin assembly.

13. The method of claim 12, wherein the biasing comprises biasing the pins in at least two different directions.

14. The method of claim 12, wherein the biasing comprises biasing the pins towards the feed hole plate.

15. The method of claim 11, wherein the adhering comprises brazing, using an adhesive, or welding.

16. The method of claim 11, wherein the pins are individually coated prior to aligning the pins on the output surface of the feed hole plate.

17. A honeycomb extrusion die comprising:

a feed hole plate comprising feed holes that extend through the feed hole plate, from an input surface of the feed hole plate to an opposing output surface of the feed hole plate; and a pin assembly comprising pins disposed on an output surface of the feed hole plate, one or more of the pins comprising:

a head comprising alignment surfaces configured to align the pins, flow surfaces disposed between the alignment surfaces, and a tapered portion comprising a contact surface adhered to the output surface of the feed hole plate, wherein the contact surface is spaced axially from the alignment surfaces by the tapered portion, wherein the contact surface comprises a first cross-sectional width that is less than or equal to a distance between adjacent feed holes, such that the contact surfaces do not overlap the feed holes, and wherein a second cross-sectional width between opposing alignment surfaces is greater than the first cross-sectional width, such that the head is tapered by the tapered portion from the second cross-sectional width at the alignment surfaces to the first cross-sectional width at the contact surface; and a tail connected to the head and extending away from the feed hole plate, wherein the alignment surfaces of the pins contact adjacent pins, such that the tails of adjacent pins are spaced apart to at least partially define discharge slots, and the flow surfaces of adjacent pins are spaced apart to at least partially define channels.

* * * * *